UNITED STATES PATENT OFFICE.

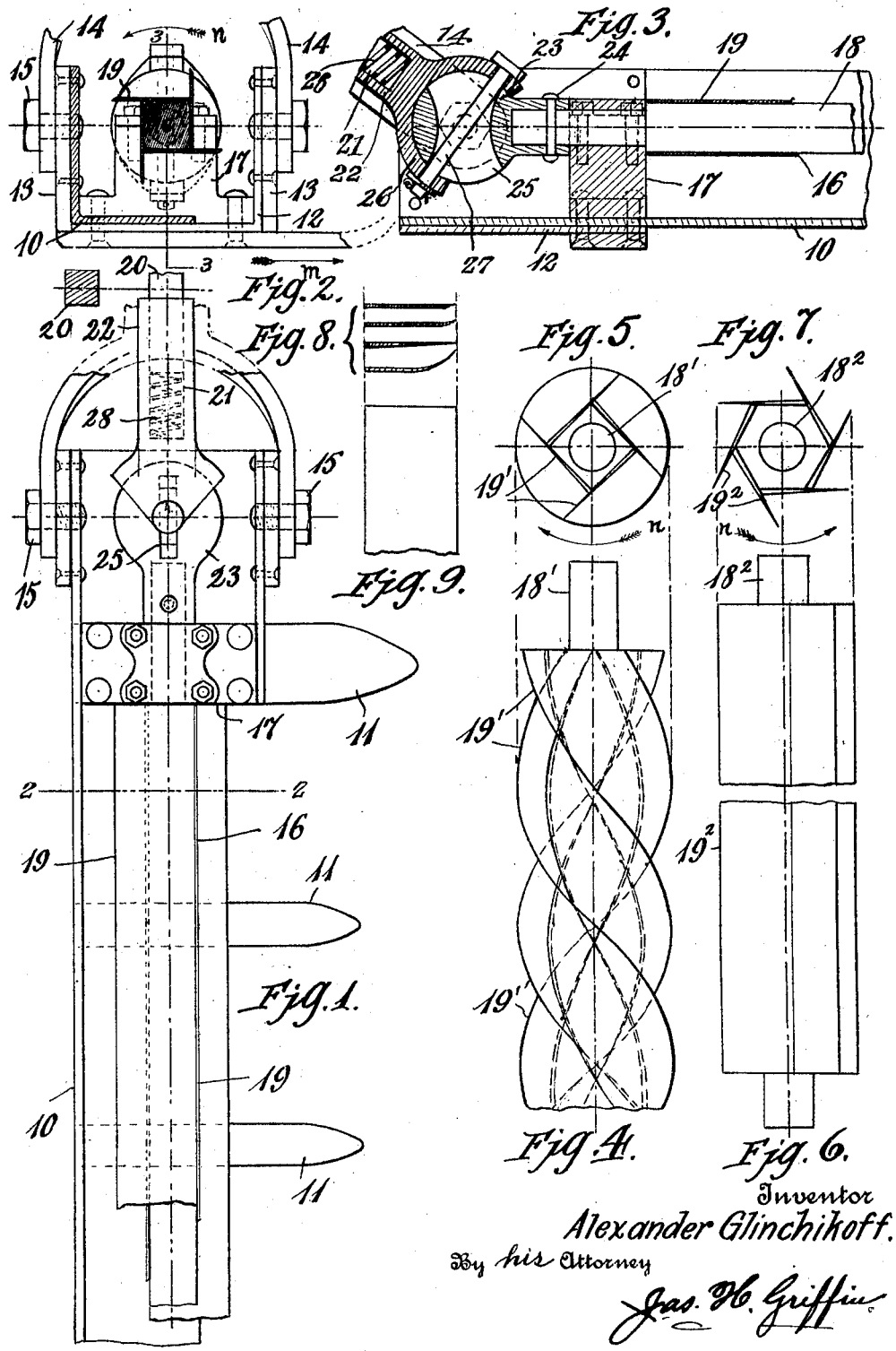

ALEXANDER GLINCHIKOFF, OF NEW YORK, N. Y.

CUTTING MECHANISM FOR MOWING-MACHINES, HARVESTERS, REAPING-MACHINES, AND BINDERS.

1,392,010. Specification of Letters Patent. Patented Sept. 27, 1921.

Application filed February 16, 1920. Serial No. 358,863.

*To all whom it may concern:*

Be it known that I, ALEXANDER GLINCHIKOFF, a citizen of Russia, residing at New York city, borough of Bronx, county of Bronx, and State of New York, have invented a certain new and useful Improved Cutting Mechanism for Mowing-Machines, Harvesters, Reaping-Machines, and Binders, of which the following is a specification.

This invention relates to cutting mechanism for use on mowing machines, harvesters, reapers and binders and is more particularly directed to the provision of rotary cutting mechanism for such machines, the object of the invention being to provide rotary cutting mechanism of simple, economical and efficient construction.

Machines having rotary knives have been suggested heretofore, but these machines have generally embodied a plurality of disk cutters geared together through a train of gearing coextensive with the number of cutters employed. As a large number of such cutters were necessarily used, considerable power was required to drive the same, with the result that they have never gone into general use.

In accordance with the present invention, the machine embodies a single rotary cutter which may differ in form, but, in any event, is of a unitary nature, so that it may be driven at a high speed with minimum power expenditure. Moreover, the cutter is of simple construction, is economical to manufacture, and is adapted to cut the hay or grain by virtue of the high velocity of its rotation, thereby minimizing friction and the power required to operate the same. The present invention is equally adaptable to power operated mowers or horse driven machines, and may be operated at an expenditure of less power than is usually required in machines of the well known type embodying reciprocating cutters.

Features of the invention, other than those specified, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1 is a plan view of a portion of a finger bar with a cutter associated therewith embodying the present invention.

Fig. 2 is a section on the line 2—2 of Fig. 1.

Fig. 3 is a section on the line 3—3 of Fig. 2.

Fig. 4 is a side view of one end of one form of cutter, which may be employed.

Fig. 5 is an end view of the form of cutter shown in Fig. 4.

Fig. 6 is a view corresponding to Fig. 4, but showing another form of cutter.

Fig. 7 is an end view of the cutter of Fig. 6.

Fig. 8 shows different sections of cutter blades which may be used to advantage in the building up of the cutter shown in Fig. 2; and, Fig. 9 is a face view of one end of the blade sections shown in Fig. 8.

Referring to the drawings, 10 designates the finger bar of the machine, to which is secured fingers 11 as usual. To one end of the finger bar 10 is secured an angle section 12, and to the bar 10 and angle section 12 are riveted plates 13 for suitably conditioning said bar or reinforcing the same to adapt it to be pivotally mounted on the wheel portion of the mower. This pivotal connection is accomplished by means of a bracket 14, one end of which is pivoted to the wheel portion of the machine, and the other end of which is bifurcated and pivoted by means of bolts or screws 15 to the plates 13 as clearly shown in Figs. 1 and 2. The bracket 14 is in the form of a tubular portion and it is through this tubular portion that the shaft which operates the cutter extends. Of course, it will be understood that the bracket 14, while pivotally mounted on the machine for vertical oscillation is so fixed thereto that it is at all times maintained at right angles to the direction of the movement of the machine.

Mounted on the opposite ends of the finger bar 10 are bearings 17, one near the base end of the bar and one near the outer end thereof. These bearings provide a support for a rotary cutter 16 and in these bearings said cutter is journaled for rotation.

The cutter may partake of different forms as shown in the drawings without departing from the present invention. For example, in Figs. 4 and 5, the cutter is shown as embodying a core 18', on which is fixed a plurality of helical blades 19'. In Figs. 6 and 7, the core $18^2$ is shown in the form of a hexagonal prism provided with cylindrical bearing sections at its opposite ends. Upon each face of the prismatic section is secured, by means of screws or otherwise, a knife blade $19^2$ as clearly shown in Fig. 7.

However, in the preferred form of construction shown in Figs. 1, 2 and 3, the core 18 of the cutter is shown as squared and knives 19 are secured to each face of the squared core as illustrated in Fig. 2. Those portions of the core 18 as are journaled in the bearings 17 are made cylindrical to adapt the cutter for rotation. The cutter is driven through a shaft 20 which passes through the hollow portion of the bracket 14 and has a squared end which fits into a pocket 21 in one member of universal joint connection, the other member of which bears reference numeral 23. The member 23 is secured to the adjacent end of the cutter 16 by means of a pin or rivet 24 and said member has a spherical or ball shaped head through which passes a slot 25. The member 22 is provided with a socket 26 adapted to coöperate with the ball shaped end of the member 23 so as to form, in effect, a ball and socket joint, and the parts of this joint are secured together for rotation by a bolt 27, which is passed through the walls of the socket 26 and through the slot 25 of the member 23, all as clearly shown in Fig. 3. However, in order that the members of the universal joint may be maintained in contact with one another, the spring 28 is interposed between the base of the pocket 21 and the end of the shaft 20 and this spring forces said members into intimate engagement. It will be understood, that the shaft 20 which drives the cutter is in turn driven from the wheel portion of the machine in any well known conventional manner.

The knives which are employed in the cutter construction may vary in section and in Fig. 8 I have shown different sections of knives which may be employed. It will be understood, however, that still other sections may be used without departing from this invention.

From the foregoing description of the machine, the operation thereof will be apparent, but may be briefly described as follows. The cutter, which is mounted for rotation in the bearings 17, is rotated through the universal joint from the shaft 20 preferably in the direction of the arrow $n$ in the drawings. In practice, the cutter is driven preferably at a high rate of speed so that when the machine is traveling in the direction of the arrow $m$ in Fig. 2 of the drawings, the knives of the cutter will successively attack the grass or grain in rapid succession and effect a cutting action thereon in an upwardly and forwardly direction with respect to the finger bar. As a result of this operation, the cutter will maintain itself free and the cut grass or grain will be thrown away from the cutter. When it is desired to move the machine without mowing, the finger bar may be tilted up in the usual way and the machine may then be moved from place to place without fear of injury to the cutting mechanism thereof.

It will be understood that the specific invention described may be modified in formal respects, such as by the substitution of equivalents. For example, in the preferred embodiment of the invention of Figs. 1, 2 and 3, the cutter is shown as having four blades, whereas in the construction of Figs. 6 and 7, it is shown as embodying six blades. In practice, the cutter may be provided with any number of blades desired, $i.$ $e.$, of a greater or lesser number than that shown. Furthermore, while I have illustrated the finger as pivotally mounted on the bracket 14, in a particular way, it will be manifest that these parts may be otherwise pivotally associated with one another without departing from the invention. Moreover, parts of the complete mechanism described may be used alone, or in other environments, without departing from the spirit or substance of the broad invention, the scope of which is commensurate with the appended claims.

Having thus fully described the invention, what I claim as new and desire to secure by Letters Patent is:

1. A mowing machine embodying a pivoted finger bar, a cutter positioned above the finger bar and mounted for rotation, said cutter embodying a plurality of sharpened blades, a shaft for rotating the cutter, a ball and socket universal joint connecting the drive shaft to the cutter, said shaft being locked for rotation with one element of the universal joint and longitudinally adjustable relative thereto, and a spring coöperating with the shaft and said element of the universal joint for maintaining the ball and socket portions of said joint in coöperative relation.

2. A mowing machine embodying a finger bar, a cutter mounted for rotation above the finger bar and provided at one end with one element of a ball and socket joint, a coöperating element of the ball and socket joint associated with the element thereof mounted on the cutter and provided with a pocket, a drive shaft extending into said pocket and locked against rotation therein whereby the cutter may be rotated from the drive shaft, a spring positioned within the pocket and bearing against the base of the pocket and the end of the drive shaft to resiliently maintain the elements of the ball and socket joint in coöperative relation, and means for locking the elements of the ball and socket joint together for simultaneous rotation.

3. A mowing machine embodying a finger bar, a cutter mounted for rotation above and extending longitudinally of the finger bar, said cutter embodying a plurality of blades, means for rotating the cutter in a direction to cause the blades to cut in an upward and forward direction relative to the direction of movement of the machine, and means for supporting the cutter and finger bar for pivotal movement into and out of cutting position.

4. A mowing machine embodying a finger bar, a rotary cutter positioned above and extending longitudinally of the finger bar, a drive shaft for rotating the cutter, ball and socket connections between the drive shaft and the cutter, and means for securing the elements of the ball and socket connection together for rotation without interfering with universal movement between said elements.

5. A mowing machine embodying a finger bar, a rotary cutter, positioned above and extending longitudinally of the bar and provided at one of its ends with a ball section of a ball and socket joint, which ball section is provided with a slot extending diametrically therethrough, a drive shaft provided at one of its ends with a socket section of a ball and socket joint, resilient means for maintaining the sections of the ball and socket joint in engagement with one another and a pin passed through the socket section and extending through the slot of the ball section to lock said sections together for rotation without interfering with their capability for relative universal movement.

In testimony whereof, I have signed my name to this specification.

ALEXANDER GLINCHIKOFF.